3,375,163
PARASITICIDE METHODS AND COMPOSITIONS EMPLOYING ORGANOFLUOROSILANES
Wendell K. Whitney, Midland, Mich., assignor to The Dow Chemical Company, Midland, Mich., a corporation of Delaware
No Drawing. Filed May 18, 1964, Ser. No. 368,413
7 Claims. (Cl. 167—39)

The present invention relates to fumigation by the use of organofluorosilanes and is particularly concerned with fumigants for the control of many pests such as insects, arthropods, bacteria, and fungi in grain, its milled products, used cloth, nursery stock and other infested areas.

The application of fumigant materials offers an excellent method for the control of various pests, particularly household pests such as termites, spiders and the insects, bacteria, yeasts and fungi and particularly the control of pests to be found in grain and its milled products. However, utilization of such a method has been severely limited by the inability of many fumigant materials to penetrate in lethal or parasiticidal concentrations and to penetrate to any substantial depth in grain or its milled products. The use of other known fumigant materials has generally been hampered by the disagreeable odor and flavor characteristics which they impart to matter fumigated. Thus, the hazard of off-flavor and ill-smelling grain has curtailed wide-spread employment of many such materials. These shortcomings of known treatment methods have created special difficulty in the fumigation of these products.

It is an object of the present invention to provide a new and improved method of fumigation for the control of many pests such as nematodes, arthropods, bacteria, molds, yeasts, termites, roaches and other insects. It is a further object to provide a method and composition for the fumigation of grain and its milled products. Another object is the provision of a method and composition which will accomplish superior penetration of grain and its milled products. An additional object is the provision of a method which does not impart offensive odor to fumigated materials or adversely affect the germination of grain. Other objects will become apparent from the following specification and claims.

According to the present invention it has been discovered that matter infected or infested with arthropods, bacteria, yeasts, fungi, nematodes and insects, advantageously may be fumigated and the organisms killed by treatment with organofluorosilanes corresponding to the formula

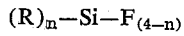

$$(R)_m-Si-F_{(4-n)}$$

In the present specification and claims R represents lower alkyl, lower alkenyl and lower alkynyl and $n$ represents one of the integers 1, 2, or 3. Lower alkyl, lower alkenyl and lower alkynyl are employed to designate carbon chains containing up to and including 4 carbon atoms. These compounds are gases at room temperature or low boiling liquids. More particularly, it has been discovered that grain and its milled products and other foodstuffs may be fumigated with or exposed to the vapors of these organofluorosilane compounds to control bacteria, fungi and insects without imparting undesirable odor characteristics to the fumigated products. Such fumigation operations are carried out in an enclosed space or otherwise to insure sufficient period of contact of the fumigant with the infesting organisms. The organofluorosilanes of the present invention are non-explosive gases or liquids at ordinary room temperatures and therefore, are easily and conveniently adapted for fumigation procedures and particularly for the fumigation of grain and its milled products. Further, the compounds have desirable penetrating properties whereby their vapors diffuse through and permeate, in parasiticidal concentrations, the interstices of grain and its milled products to an extreme depth and within a relatively short period of time.

The exposure of bacteria, yeasts, fungi, nematodes, arthropods, or insects to at least a minimum effective dosage of organofluorosilane compounds is essential for the practice of the present invention. Such exposure can be carried in soil for the control of soil dwelling pests. The dosage is oftentimes employed in an enclosed space and with amounts equal to lethal or parasiticidal concentrations. When fumigating clothing, grain and its milled products, etc., good results are obtained when the organofluorosilanes are employed in an amount corresponding to at least 0.1 of a pound for 1000 cubic feet of space within which the product is enclosed. Alternatively, the fumigation of soil or other growth media may entail the injection of the organofluorosilane compounds or solutions thereof under the surface of the soil followed by rolling or wetting the surface of the treated soil to provide a seal.

In carrying out the present invention, the matter can be fumigated or exposed to the vapors of the organofluorosilanes in any convenient manner. Representative organofluorosilanes include ethyl methly difluorosilane, n-propyl trifluorosilane, trimethyl fluorosilane, dimethyl difluorosilane, methyl trifluorosilane, methyl di-n-butyl fluorosilane, triethyl fluorosilane, vinyl n-butyl difluorosilane, allyl ethyl difluorosilane, divinyl methyl fluorosilane, methyl 1-butynyl difluorosilane, divinyl difluorosilane, triallyl fluorosilane, di-(2-propynyl)difluorosilane, 2-propynyl diethyl fluorosilane, 1-propynyl n-butyl trifluorosilane, di-(2-propyryl) 1-butenyl fluorosilane, di-(3-butenyl) vinyl fluorosilane and tri-(n-butyl) fluorosilane. The organofluorosilane can be distributed in soil or other growth media. When fumigating grains, the grain is placed in enclosure together with the required amount of organofluorosilane. When the employed organofluorosilane compound is a liquid, it may be poured upon the surface of the grain and/or introduced at various levels therein. If the organofluorosilane compound is a gas at ordinary temperatures, it may be introduced generally into the enclosure or at various levels within the grain. It may also be desirable to force the organofluorosilane vapors through the interstices of the material being fumigated and in some operations the organofluorosilane vapors can be recirculated through the material to be fumigated. In the fumigation of flour and milled grain products, the latter are generally bagged and thereafter placed in an enclosure together with the desired amount of fumigant materials in a vapor or vaporized form. The fumigation of nursery stock, used feed bags, or old clothing is carried out in a similar manner. In such operations, the liquid organofluorosilane compounds are generally placed in a shallow pan or sprayed upon the walls or other surfaces within the enclosure. The compound readily vaporizes to provide the required minimum concentration of 0.1 of a pound per 1000 cubic feet of space. The exposure of the infested material and undesirable organism may be carried out in some other gas other than air, e.g., nitrogen or carbon dioxide.

In an alternative method, the organofluorosilane compounds are dissolved or otherwise incorporated in a fumigant adjuvant, e.g., a volatile organic solvent diluent such as acetone, or volatile liquid haloaliphatic compound, or volatile petroleum distillate, and the resulting mixture employed in a manner as previously described. A propellant such as sulfuryl fluoride, methyl bromide, chlorotrifluoromethane or difluorodichloromethane can be mixed with such solvent compositions in a sealed container or cylinder. Such compositions are particularly useful in the line fumigation of packaged products where the fumigant material is introduced directly into the package. The preferred organic solvent carriers are those of such volatility that they evaporate from the matter treated and leave little permanent residue therein. A preferred liquid adjuvant is a carefully cut petroleum distillate fraction boiling almost entirely under 400° F. and having a flash point above about 85° F. In these liquid compositions, the solvent material cooperates with the active agents so as to facilitate the invention and obtain an improved result. The exact concentration of the organofluorosilane compound to be employed in the solvent fumigation composition is not critical. The required dosage of the organofluorosilane compound generally can be supplied with compositions containing from about 0.1 to 98 percent by weight of toxicant.

Other materials which may be combined with the organofluorosilanes, either as volatile solvents or as supplementary toxicants or both, and include ethylene dibromide, ethylene dichloride, carbon tetrachloride, ethylene oxide, propylene oxide, carbon bisulfide, trichloroethylene, 1,3 - dichloropropene, tetrachloroethylene, 1,2 - dibromo-3-chloropropane, propylene chloride, 1,2,3-tribromopropane, chloropicrin, propargyl bromide, methyl bromide, hexachlorobenzene ($\alpha$-isomer), $\beta,\beta'$-dichloro ethyl ether, pyrethrum, ryania, O,O-diethyl O - 2 - isopropyl-6-methyl-4-pyrimidyl) - thiophosphate, 1,2,3,4,10, 10 - hexachloro - 6,7 - epoxy-1,4,4a,5,6,7,8,8a-octahydro-1,4 - endoexo - 5,8-dimethanonaphthalene, acrylonitrile, 1,1,1 - trichloro-2,2-bis(p-chlorophenyl)ethane, $CCl_4$:$CS_2$ (80:20 by volume), ethylene dichloride:$CCl_4$ (3:1 by volume), $CCl_4$:ethylene dichloride:ethylene dibromide (60:35:5 by volume), $CCl_4$:$CS_2$:ethylene dichloride:ethylene dibromide (77:10:10:3 by weight) and 1-naphthyl N-methylcarbamate. In addition, combination of the various organofluorosilanes can be employed or combined with the above mentioned compounds. These compositions can be prepared by mixing liquefied organofluorosilane with the supplementary material in a sealed container and are of outstanding value for the fumigation of infested areas where superior penetrating properties are desired. Alternatively, such compositions may be similarly dissolved or otherwise incorporated in an inert solvent and the latter compositions employed in the present method as previously described.

According to the present invention, grain and its milled products are generally exposed to the vapor for a period of one hour or longer, the exact period of time being dependent upon the nature and size of the treating chamber and the ease with which the vapors may permeate the product to be fumigated, e.g., whether the grain or flour is being fumigated. In smaller enclosures, exposures from a few minutes to a few hours may be sufficient to accomplish penetration and the killing of the organisms. In large enclosures and with large quantities of material to be fumigated, periods of up from 72 hours or longer may be desirable. Fumigation with organofluorosilane may be carried out between temperatures of −5 and 70° C. The preferred temperature range is from 0 to 40° C. Such fumigation can be carried out at pressures from atmospheric pressure to two centimeters of mercury.

The following examples illustrate the invention but are not to be construed as limiting the same.

EXAMPLE 1

Ethyl methyl difluorosilane, n-propyl trifluorosilane, trimethyl fluorosilane, dimethyl difluorosilane, divinyl ethynyl fluorosilane, 2-propynyl dimethyl fluorosilane, tri-(1-butynyl)fluorosilane and methyl trifluorosilane are separately employed for the fumigation of enclosures, the inner walls and surfaces of which are infested with adult confused flour beetles (*Tribolium confusum*). In such operations, the compounds are introduced in separate operations into the enclosures in amounts sufficient to provide concentrations of 0.1 pound of the vapors of one of the compounds per 1000 cubic feet of space. The interior surfaces of the enclosures and their infesting organisms are thereafter exposed to the vapors for a period of 16 hours and at a temperature of about 26.5° C. As a result of these operations, there is obtained a 100 percent kill of the infesting organism with each named silane compound.

EXAMPLE 2

In exactly similar operations, the compounds employed in Example 1 and divinyl ethynyl fluorosilane, propyl 3-butynyl difluorosilane, triallyl fluorosilane, vinyl trifluorosilane and tri-n-butyl fluorosilane are employed separately for the control of black carpet beetle larvae (*Attagenus piceus*). As a result of such operations, a 100 percent kill of the beetles is obtained with each silane compound at a concentration of 0.5 pound of toxicant compound per 1000 cubic feet of space.

EXAMPLE 3 n-Propyltrifluorosilane and trimethylfluorosilane are employed exactly as described in Example 1 for the control of granary weevil (*Sitophilus granarius*). In such operations, a 100 percent kill of the weevil is obtained with each named silane compound at a concentration of 0.5 pound of toxicant per 1000 cubic feet of space.

EXAMPLE 4

The organofluorosilanes are also employed for the fumigation of corn, wheat and beans. In these operations, one of the above seed types infested with black carpet beetle larvae and confused flour beetle adults is placed in a fumigant chamber and a 1.0 percent solution of organofluorosilane in carbon tetrachloride introduced into the chamber in an amount sufficient to provide a concentration of 2 pounds of the organofluorosilane compound per 1000 cubic feet of space. In the fumigation operations, each of the seed types is exposed to the vapors of the organofluorosilane compound for a period of 16 hours and at a temperature of 26.5° C. As a result of these operations, there is obtained a 100 percent kill of the infecting organisms. Following the fumigation operations, the grain is aerated for one week. At the end of this period, no offensive odor attributable to the action of the organofluorosilane compound is found in the fumigated seed. Tests are also carried out in which the fumigated seed and unfumigated seed are planted to ascertain whether or not the treatments had affected germination. The determinations show that the fumigation operations have not adversely affected the viability of the fumigated corn, wheat, and beans. Organofluorosilanes as are employed in the above operations include trimethyl fluorosilane, trivinyl fluorosilane, n-butyl allyl difluorosilane and diethynyl ethyl fluorosilane.

EXAMPLE 5

Each organofluorosilane as identified in Examples 1 and 2 is mixed with liquefied dichlorodifluoromethane in a cylinder to prepare self-propellant fumigant compositions containing 85 percent by weight of one of the toxicants. These compositions are separately introduced into airtight bins of oats which are infested with adult confused flour beetles and black carpet beetle pupae; one composition being employed per bin. The amount of fumigant composition employed is sufficient to provide a concentration of one pound of the vapors of one of the organofluorosilane compounds per 1000 cubic feet of space in the bin. The oats are stored in the bin to a depth of 6 feet. After 3 days exposure at an average temperature of about 26.5° C., a complete kill of the infesting insects is observed at all levels in the grain in the several fumigated bins. The fumigated grain from the several bins is thereafter aerated for 2 weeks. At the end of this period, the treated grain from the several bins is not characterized by an offensive odor attributable to the action of the organofluorosilane compounds.

EXAMPLE 6

Trimethyl fluorosilane is also employed for the fumigation of wheat flour. In such operations, flour infested with confused flour beetle adults, larvae, pupae and eggs and with black carpet beetle larvae is placed in a fumigant chamber and the trimethyl fluorosilane compound introduced into the chamber as an 80 percent solution in carbon tetrachloride in an amount sufficient to provide a concentration of 1.0 pound of trimethyl fluorosilane compound per 1000 cubic feet. In the fumigation operations, the flour is exposed to the vapors of the toxicant for about 16 hours. As a result of this exposure, there is obtained a 100 percent kill of the infesting organisms to a depth of 9 inches in the finely milled product. The flour is then aerated. Sensory examination and inspection of the flour, one week following the exposure, indicates no evidence of offensive odor attributable to the action of the silane compound.

EXAMPLE 7

Corn infested with granary weevils is fumigated in separate operations, with a one percent solution of n-propyl trifluorosilane, ethyl methyl difluorosilane, and trimethyl fluorosilane in carbon tetrachloride by treating the corn in a fumigant chamber with one of the compositions at a dosage of 0.25 pound of organohalosilane compound per 1000 cubic feet of space. In the fumigation operations, the corn is exposed to the vapors of one of the toxicant compounds for a period of 16 hours. As a result of these operations, there is obtained a 100 percent kill of the granary weevils with each named compound.

EXAMPLE 8

Ethyl methyl difluorosilane, ethyl 2-butenyl difluorosilane, 1-propynyl diallyl fluorosilane, triallyl fluorosilane, trimethyl fluorosilane, dimethyl difluorosilane, n-propyl trifluorosilane are each employed for the line fumigation of dried prunes packaged in sealed bags of Saran (polyvinylidene chloride) film. In such operations, each organofluorosilane compound is mixed with monochlorotrifluoromethane in a pressure container to prepare a self-propellent composition containing 80 percent by weight of one of the silane compounds. The pressure container is equipped with metering valve to discharge a measured portion of the toxicant through a needle orifice into each packaged food container. The amount of the composition introduced into each food container is sufficient to provide in each package a concentration of 1.0 pound of organofluorosilane compound per 1000 cubic feet. Following the introduction of the fumigant, the discharge needle is withdrawn drom the bag and the perforation therein sealed. The fumigated prunes and unfumigated but similarly packaged prunes are then stored at an average temperature of about 75° F. After one month of storage, various of the fumigated and unfumigated packages are selected at random and examined for the development of mold and mildew on the packaged contents. The examination shows that, a commercial control of mildew and mold on the fumigated prunes has been obtained with each silane compound. At the time of the observations many of the unfumigated and packaged prunes show a heavy growth of these organisms.

EXAMPLE 9

In another similar operation, nursery stock infested with two-spotted spider mites, oystershell scale and green peach aphids is placed in the fumigation chamber and the organofluorosilane toxicant added in an amount sufficient to provide 0.5 pound of toxicant vapor per 1000 cubic feet. The infested nursery stock is allowed to remain in the chamber exposed to the fumigant for 16 hours, after which the nursery stock is removed and examined to determine the extent of kill of the infesting insects. It is observed that all of the infesting pests have been killed. Representative organofluorosilanes include methyl trifluorosilane, ethyl methyl difluorosilane, allyl 3-butenyl difluorosilane, trivinyl fluorosilane, diallyl difluorosilane, di-(2-propynyl) ethynyl fluorosilane and triethyl fluorosilane.

The silane compounds as employed in accordance with the teachings of the present invention can be prepared in known procedures. In a convenient procedure, the compounds are produced by a Grignard reaction wherein one or more aliphatic magnesium halides (RMgX) are reacted with a silicon tetrahalide and preferably silicon tetrachloride. In such operations, one or more R groups can be introduced into the molecule by employing 1, 2 or 3 molecular proportions of Grignard reagent with one molecular proportion of the silicon tetrahalide. Also, a plurality of the same or different R groups can be introduced into the molecule by employing a plurality of different Grignard reagents with equivalent proportions of the Grignard reagent and silicon tetrahalide. Representative Grignard reagents include vinyl magnesium chloride, 3-butyl magnesium bromide, 1-propynyl magnesium chloride, 2-butynyl magnesium chloride, n-butyl magnesium bromide, allyl magnesium chloride, 2-butenyl magnesium chloride and 1-propenyl magnesium chloride. In those instances wherein the tetrahalide is other than the tetrafluoride, the corresponding halosilane such as the chloro silane, bromo silane, etc., are produced. Representative halosilanes include diallyl propyl bromosilane, di-(2-propynyl)dichlorosilane, 2-butenyl dimethyl bromosilane, tri-(1-propynyl)bromosilane, methyl dibutyl chlorosilane, 3-butynyl divinyl chlorosilane, methyl propyl dichlorosilane, ethynyl trifluorosilane and tri-(2-butenyl)bromosilane. These silanes can be converted to the fluorosilanes in known procedures by treatment with a conversion agent such as zinc fluoride, ammonium fluoride, tetraalkyl quaternary ammonium fluoride or hydrofluoric acid. In such conversions, hydrofluoric acid is not employed with the halosilanes containing unsaturated substituents.

In an alternative method, many of the compounds as employed in accordance with the present invention can be prepared by reacting a suitable alkyne compound with a mono-, di- or trihalosilane to introduce one or more alkenyl groups for hydrogen in the halosilane molecule. In such reaction, the alkyne reagent adds to the halosilane reactant with isomerization and the reduction of the unsaturation. In such operations, one or more alkenyl groups can be introduced into the molecule depending upon the number of acid hydrogen atoms in the halosilane starting material and whether one, two or three molecular proportions of alkyne reagents are employed with one molecular proportion of the halosilane. Also, a plurality of the same or different alkenyl groups can be introduced into the molecular proportion by employing different alkyne compounds and suitable proportions of such compounds with the halosilane reagents. Oftentimes, the reactions conveniently are carried out with an organic peroxide as catalyst. Additionally, the mono-, di- or trihalosilane starting material may contain a plurality of aliphatic substituents. When chloro or bromo silanes rather than fluorosilanes are prepared they may be converted to the fluorosilanes as previously taught.

I claim:

1. A method for controlling arthropods and fungi which comprises exposing matter infested with these organisms to the vapors of an organofluorosilane corresponding to the formula

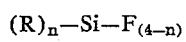

wherein each R represents a member of the group consisting of lower alkyl, lower alkenyl and lower alkynyl and $n$ represents one of the integers 1, 2, and 3; the exposure being carried out in an enclosed space and with an amount of organofluorosilane sufficient to provide a concentration of at least 0.10 pound per 1000 cubic feet of enclosed space.

2. A method for controlling arthropods and fungi which comprises the step of fumigating grain and its milled products infested with these organisms with an organofluorosilane corresponding to the formula $$(R)_n—Si—F_{(4-n)}$$

wherein each R represents a member of the group consisting of lower alkyl, lower alkenyl and lower alkynyl and $n$ represents one of the integers 1, 2, and 3 in the minimum proportion of at least 0.10 pound of organofluorosilane per 1000 cubic feet of space to be fumigated.

3. A method for controlling arthropods and fungi which comprises fumigating grain and its milled products infested with these organisms with a composition including an organofluorosilane corresponding to the formula $$(R)_n—Si—F_{(4-n)}$$

wherein each R represents a member of the group consisting of lower alkyl, lower alkenyl and lower alkynyl and $n$ represents one of the integers 1, 2 and 3 as an active toxic ingredient in intimate admixture with a fumigant adjuvant as a carrier therefor, the treatment being carried out in an enclosed space at a minimum dosage of at least 0.10 pound of an organofluorosilane compound per 1000 cubic feet of said space.

4. The method claimed in claim 1 wherein the organofluorosilane is trimethyl fluorosilane.

5. The method claimed in claim 1 wherein the organofluorosilane is dimethyl difluorosilane.

6. The method in claim 1 wherein the organofluorosilane is ethylmethyl difluorosilane.

7. The method of claimed in claim 1 wherein the organofluorosilane is n-propyl trifluorosilane.

References Cited

UNITED STATES PATENTS 3,256,144   6/1966   Merker _____ 167—22

ALBERT T. MEYERS, *Primary Examiner.*

J. GOLDBERG, *Assistant Examiner.*